United States Patent
Thompson et al.

(10) Patent No.: US 7,542,376 B1
(45) Date of Patent: Jun. 2, 2009

(54) VESSEL-MOUNTABLE SONAR SYSTEMS

(75) Inventors: Roger L. Thompson, Kirkland, WA (US); Jason L. Seawall, Seattle, WA (US); Scott Thomas Bachelor, Poulsbo, WA (US)

(73) Assignee: Blueview Technologies, Inc., Seattle, WA (US)

( * ) Notice: Subject to any disclaimer, the term of this patent is extended or adjusted under 35 U.S.C. 154(b) by 0 days.

(21) Appl. No.: 11/829,822

(22) Filed: Jul. 27, 2007

Related U.S. Application Data

(60) Provisional application No. 60/833,875, filed on Jul. 27, 2006.

(51) Int. Cl.
*G01S 15/89* (2006.01)

(52) U.S. Cl. ...................................... 367/104
(58) Field of Classification Search ................. 367/173, 367/165, 128, 111, 88, 12, 11, 7
See application file for complete search history.

(56) References Cited

U.S. PATENT DOCUMENTS

| | | | |
|---|---|---|---|
| 4,935,906 A * | 6/1990 | Baker et al. ................. 367/104 |
| 4,980,872 A * | 12/1990 | Oler et al. ................... 367/104 |
| 6,678,210 B2 | 1/2004 | Rowe | |
| 6,870,793 B2 * | 3/2005 | Ishihara et al. .............. 367/104 |
| 7,035,166 B2 * | 4/2006 | Zimmerman et al. .......... 367/88 |
| 7,123,546 B2 * | 10/2006 | Zimmerman et al. .......... 367/11 |
| 7,173,879 B2 | 2/2007 | Zimmerman et al. | |
| 2005/0007882 A1 | 1/2005 | Bachelor et al. | |
| 2006/0007308 A1 | 1/2006 | Ide et al. | |
| 2007/0025183 A1 | 2/2007 | Zimmerman et al. | |
| 2007/0061076 A1 | 3/2007 | Schulman | |
| 2007/0159922 A1 * | 7/2007 | Zimmerman et al. ........ 367/103 |
| 2008/0130413 A1 | 6/2008 | Bachelor et al. | |

* cited by examiner

*Primary Examiner*—Dan Pihulic
(74) *Attorney, Agent, or Firm*—Ann W. Speckman; Speckman Law Group PLLC

(57) ABSTRACT

A vessel-mountable integrated sonar system is provided. The vessel-mountable integrated sonar system comprises at least one imaging sonar data acquisition device and at least one processing system electronically and removably connected to the at least one imaging sonar data acquisition device, wherein the sonar data acquisition device preferably provides acoustic data to the processing system, producing sonar imageries utilizing the acoustic data, and wherein the system provides digital tilt and azimuth direction feedback for accurate geo-referencing of data to localize targets of interest.

19 Claims, 6 Drawing Sheets

Same Virtual Target Motion on Screen Independent of Orientation

Vessel and Sensor Motion

Orientation 2

Same Virtual Target Motion on Screen Independent of Orientation

Vessel and Sensor Motion

Orientation 1

Same Virtual Target Motion on Screen Independent of Orientation

Vessel and Sensor Motion

Orientation 2

VESSEL-MOUNTABLE SONAR SYSTEMS

CROSS REFERENCE TO RELATED APPLICATION

This application claims priority under 35 U.S.C. § 119(e) to U.S. Provisional Patent Application No. 60/833,875, filed Jul. 27, 2006.

FIELD OF THE INVENTION

The disclosed invention relates to vessel-mountable sonar systems, and particularly vessel-mountable high resolution imaging sonar systems having homing and/or geo-referencing capabilities such that vessel operators can deploy, navigate with, and utilize the sonar systems to locate, identify, and investigate various targets in underwater environments.

BACKGROUND OF THE INVENTION

Many vessel-mountable sonar systems are known in the art. Examples of such systems include depth sounder(s), simple obstacle avoidance sonar(s), side scan sonar(s), mechanical scanning sonar(s), and manual pole mount(s). The display methods of these vessel-mountable sonar systems do not adequately facilitate navigation with the sonar imageries, and these systems are difficult to understand and challenging to operate while the vessel is moving. In addition, these vessel-mountable sonar systems do not have the capability to provide high definition resolution imaging from a moving platform on the vessel.

U.S. Pat. No. 7,035,166 discloses a sonar system comprising at least one sonar emitter, an array of sonar sensors configured to receive an echo from an outgoing signal generated by the sonar emitter and generate a raw data signal; at least one roll, tilt, and yaw sensor, an input from a sensor determining the latitude and longitude position of the sonar emitter; and circuitry adapted to collect the raw signal data, process the raw signal data to provide image data. The image is rotated responsively to the roll, tilt and yaw orientation of the sonar system as determined by the respective sensors. The roll, tilt and yaw sensor and image processing allows successive display of multiple images from successive transmissions to be oriented with the same fixed frame of reference in a direction relative to the earth.

U.S. Pat. No. 7,173,879 discloses a sonar system comprising a broad beam transmitter, a phased array receiver, a processor which utilizes a non-Fourier based beamformer, and correlation based processing techniques to extract valid targets from the beamformed data where the number of targets to search for is based on the values attained from an Adaptive Target Population Estimator processing technique. The values of the eigenvalues and the slope of successive eigenvalues are used to determine the number of targets to be searched for by the beamformer.

U.S. Pat. No. 7,123,546 discloses a sonar system comprising at least 2 transmitters with varying field of views, a receive system with a field of view which encompasses all the field of views generated by the transmitters, a control system designed to switch electronics between transmitters, and processing parameters set to correspond to the transmitters where the controller allows for the transmission and reception of a single ping before the next transmission, allowing each transmission to be differentiated in time.

SUMMARY OF THE INVENTION

Vessel-mountable high resolution imaging sonar systems having homing, localization, and/or geo-referencing capabilities are provided. The disclosed vessel-mountable systems are compact and can be detached and stowed for portability, convenience and security. The disclosed systems provide simple operator interface and allows an operator to quickly navigate a vessel towards targets of interest. The disclosed systems also provide directional image display alignment to allow an operator to easily maintain a sense of direction on a vessel.

The disclosed systems additionally provide digital tilt and/or azimuth direction feedback for accurate localization and geo-referencing of data to localize targets and/or generate image mosaics. Accurate localization and geo-referencing of targets and imagery enables multi-ping target tracking and multi-ping imagery overlay to produce improved imaging resolution via coherent or incoherent imagery and three-dimensional (3D) mosaic generation. The disclosed systems enable automated sonar aiming at target positions, in tilt and azimuth, using navigational tools such as compass(es) and/or global positioning device(s) (GPS), so that target positions can be selected by an operator on a imaging display, such that the sonar continuously aims at the targets' geo-referenced positions. This allows maintenance of proper sonar alignment independent of vessel alignment and position. Furthermore, the disclosed vessel-mountable systems provide sunlight readable touch screen display(s) for control and image display device(s), allowing an operator to maintain equilibrium on the vessel and minimizing motion sickness.

In one embodiment, the disclosed vessel-mountable sonar system comprises at least one high resolution sonar data acquisition and imaging system, and at least one processing system having data storage and display capabilities. In many embodiments, the vessel-mountable system also comprises a controllable positioning device. In this embodiment, the positioning device may comprise a pan and tilt mechanism, and the sonar data acquisition system may be removably connected to the positioning device by way of a clamping mechanism. The sonar data acquisition system and the positioning device, or the pan and tilt sonar module, may be removably connected to a pole, rod, shaft, post, or the like, forming a mountable pan and tilt sonar module. The mountable pan and tilt sonar module, comprising the sonar system and the positioning device, is electronically and preferably removably connectible to the processing system. The processing system may also be electronically connected to an integrated or stand-alone navigation system or elements of a navigation system, such as a compass, depth sounder, GPS system or the like.

The methods and systems of the disclosed invention may be used with or incorporate many different types of sonar data acquisition and imaging systems capable of producing various types of images. Many types of sonar systems are known in the art and may be incorporated in systems of the disclosed invention. The sonar data acquisition and imaging system preferably provides high definition two dimensional (2D) or three-dimensional (3D) sonar imagery utilizing multiple beams. Frequency steered sonar systems of the type described in co-pending U.S. Patent Publication 2005/0007882 A1, which is incorporated herein by reference in its entirety, are preferred for use in many methods and systems of the disclosed invention. The sonar system may, for example, comprise a 2D or 3D forward-looking sonar system of the types described in co-pending U.S. Patent Publication 2005/0007882 A1, it may comprise a 2D bathymetry sonar system that produces a relatively thin fan beam for 3D side and down scanning applications for optimizing the field of view of an object or surface of interest, or it may comprise many other 2D or 3D sonar systems. In one embodiment, the sonar system comprises at least one tilt and roll sensor. The at least one tilt and roll sensor is capable of providing tilt feedback to the processing system.

The positioning device positions and orients the sonar data acquisition system, and is preferably controllable by the processing system and/or the operator for aiming the sonar data acquisition system in a direction of interest, while being able to provide orientation information, such as tilt and roll information, homing and/or geo-referencing feedback to the processing system. The positioning device may be a pan & tilt device, pan only device, tilt only device, multi-axis positioning device, tilt with vessel orientation for pan, or the like. The positioning system may provide pivoting of a sonar data acquisition system through a single or multiple axes, and may providing scanning along a line on a single or multiple axes, or may provide rotation of the sonar data acquisition system through various arcs. The positioning device, in one embodiment, may be a ball joint-type positioning device.

The processing system, having data storage and display capabilities, comprises at least one processing unit which controls the mountable pan and tilt sonar module. The processing system also collects, stores, computes, processes, and provides sonar data and signals, sonar imagery, and navigational data and processes. In one embodiment, the processing system is a personal computer of the type that is well known in the art and designed to operate in a marine environment. In another embodiment, the processing system is a processor system integrated with the mountable pan and tilt sonar module. The processing system comprises or interfaces with at least one image display device and a plurality of control inputs.

The image display device presents the sonar imagery to the operator, may display predetermined or selected target and positioning information to an operator and, in some embodiments, the image display device may have command input capabilities and may be a touch screen having input capabilities. In another embodiment, the image display device is sunlight readable. The image display device may be installed on the vessel's ceiling, console, walls, or at an operator control station, and it may comprise a heads-up image display device system. In another embodiment, the image display device may comprise or interface with a portable display which can be worn on or held by the operator or mounted elsewhere on a vessel. In yet another embodiment, the image display device may be installed within another larger image display device system having additional image display device components.

The processing system preferably interfaces with and acquires input from a navigational system or navigational components that may be incorporated in the system of the disclosed invention or may be an independent system or group of components that interface with the processing system. In many embodiments, for example, a compass and/or a global positioning device (GPS) interface with the processing system and provide location coordinates for various vessel and target locations.

BRIEF DESCRIPTION OF THE DRAWINGS

The disclosed invention will be described in greater detail in the following detailed description, with reference to the accompanying drawings, wherein.

DETAILED DESCRIPTION OF THE INVENTION

Vessel-mountable high resolution imaging sonar systems having homing, localization, and/or geo-referencing capabilities are provided. The disclosed vessel-mountable systems are preferably compact and can be detached and stowed for portability, convenience, and security. The disclosed systems provide simple operator interface, and allow an operator to quickly identify and navigate a vessel towards targets of interest. The disclosed systems also permit an operator to track a selected target or targets of interest on sonar imagery, and may provide directional image display alignment, whereby the sonar image is displayed at an angle with respect to the vessel that corresponds to the orientation of the sonar acquisition and positioning device. This provides a more intuitive interface for an operator and allows an operator to easily track and steer toward an underwater target while maintaining a sense of direction on a vessel.

The disclosed systems additionally provide digital tilt and/or azimuth direction feedback from the sonar data acquisition system and incorporate or interface with navigational tools for accurate geo-referencing of selected targets within the range of the sonar system, which permits accurate geo-referencing of selected targets. Accurate geo-referencing of targets allows the system to generate image mosaics and to track targets and/or spatial coordinates, or to run predetermined or selected underwater surveillance programs. Accurate geo-referencing of targets and imagery also enables multi-ping target tracking and multi-ping imagery overlay to produce improved imaging resolution via coherent or incoherent imagery and 3D mosaic generation.

The disclosed systems also enable automated sonar aiming at target positions, in tilt and azimuth, using navigational tools such as compass(es) and/or global positioning device(s) (GPS), so that target positions may be selected by an operator by target coordinates or by pointing to a spatial location on a imaging display. Once one or more underwater targets are identified and geo-referenced, the sonar system may be instructed to continuously track, or aim at, the targets' geo-referenced positions. This provides maintenance of proper sonar directional alignment and maintains the sonar imagery on one or more target locations independent of vessel alignment and position. Furthermore, the disclosed vessel-mountable systems may provide sunlight readable touch screen display(s) for control and image display device(s).

Figure 1:
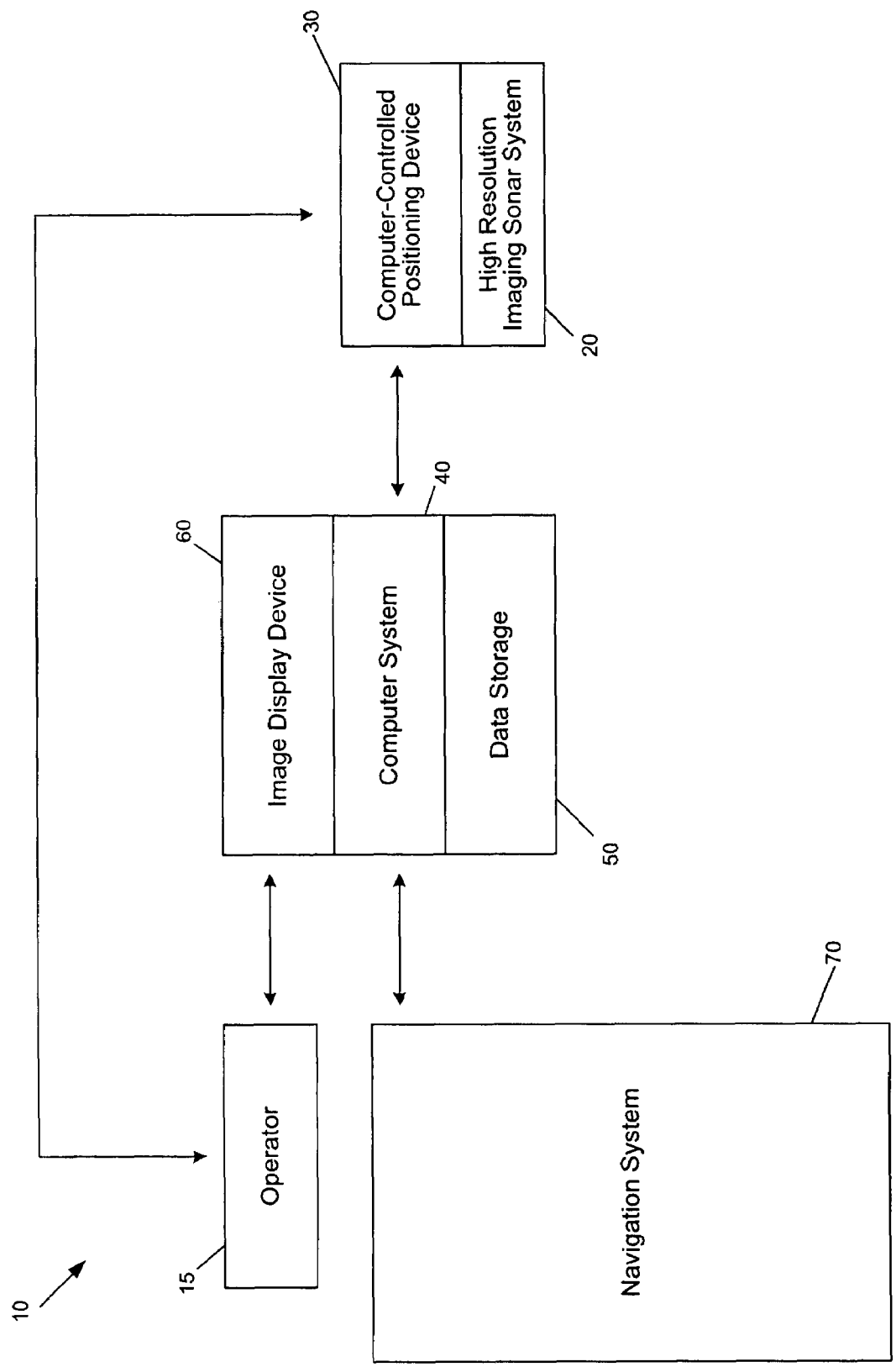
FIG. 1 illustrates an embodiment of the disclosed vessel-mountable sonar system and its interface with various other systems.

FIG. 1 shows one embodiment of a vessel-mountable integrated sonar system 10. The vessel-mountable sonar system 10 comprises at least one high resolution imaging sonar data acquisition device 20, at least one computer-controllable positioning device 30, at least one computer system 40, and data storage 50 and display 60 components. The system also preferably incorporates or interfaces with at least one navigational system 70 or one or more navigational components or tools. The terms processing system and computer system are used interchangeably in this specification and no distinctions between the terms are intended. The processing or computer systems are preferably digital and have data processing capabilities. Data storage may be incorporated in the computer system and/or provided in an auxiliary data storage device or system. The display may likewise be incorporated in the computer system or it may be provided as a separate display device that interfaces with the computer system.

Figure 2:
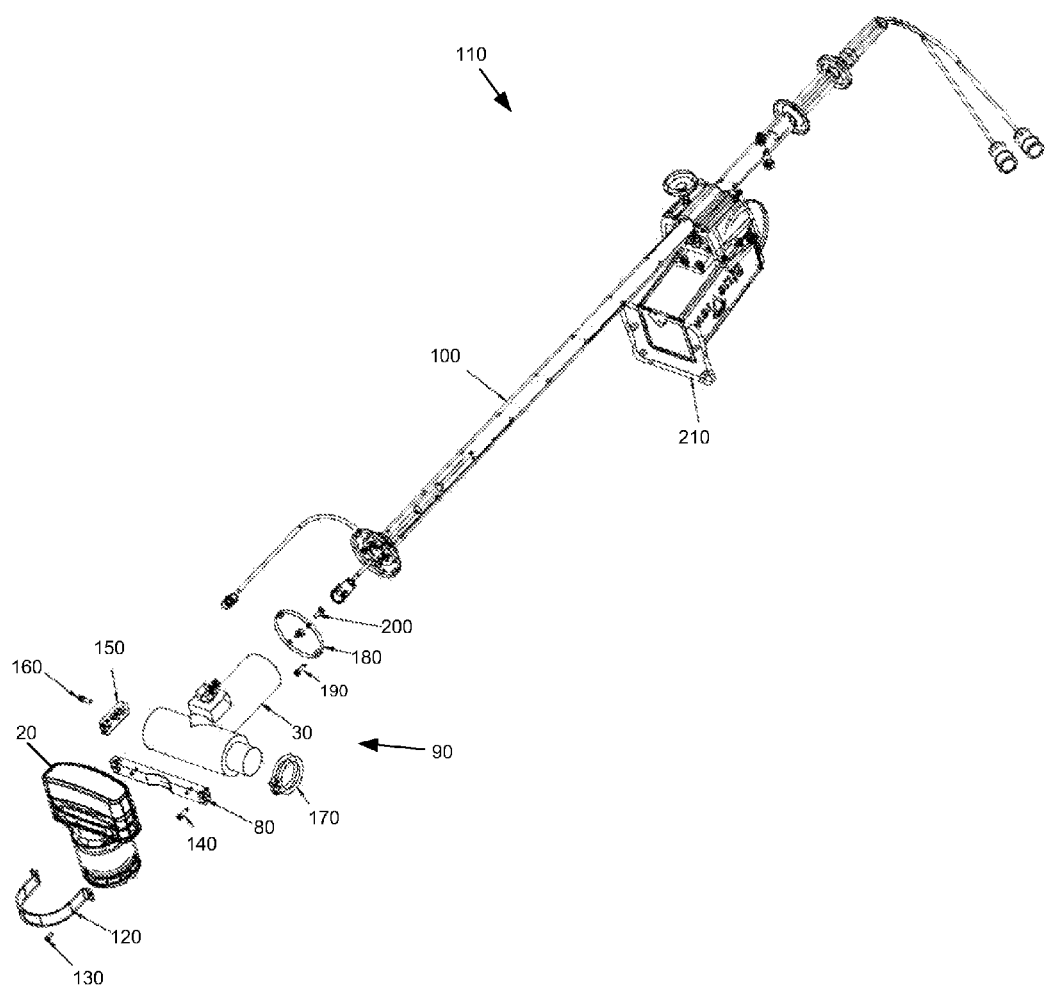
FIG. 2 illustrates an exploded perspective view of an embodiment of a vessel-mountable sonar positioning pan and tilt module.
Figure 3A:
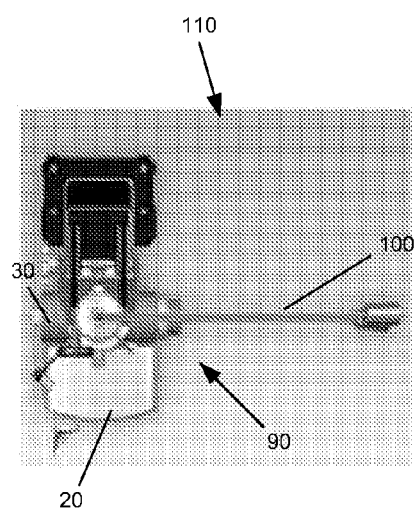
FIG. 3A illustrates a top view of the vessel mountable pan and tilt sonar module shown in FIG. 2.
Figure 3B:
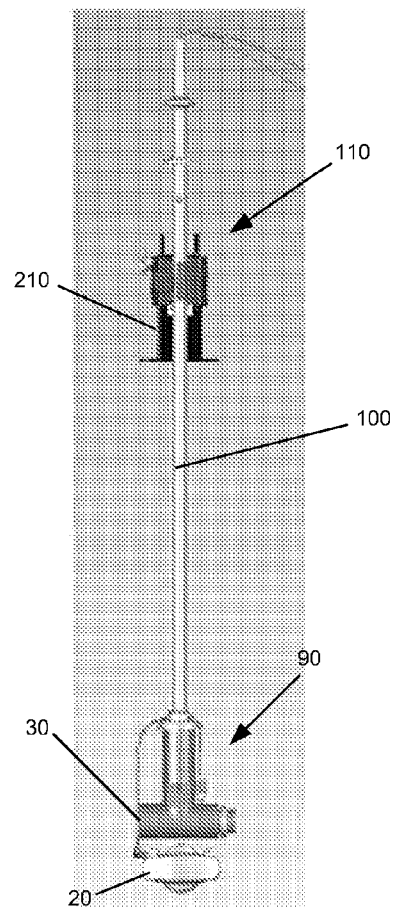
FIG. 3B illustrates a front view of the mountable pan and tilt sonar module shown in FIG. 2.
Figure 3C:
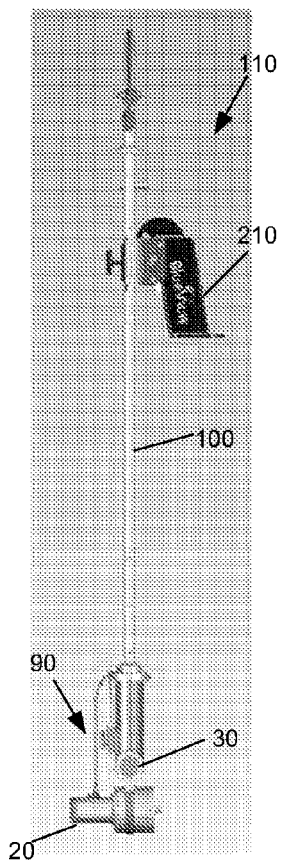
FIG. 3C illustrates a side view of the mountable pan and tilt sonar module shown in FIG. 2.
Figure 3D:
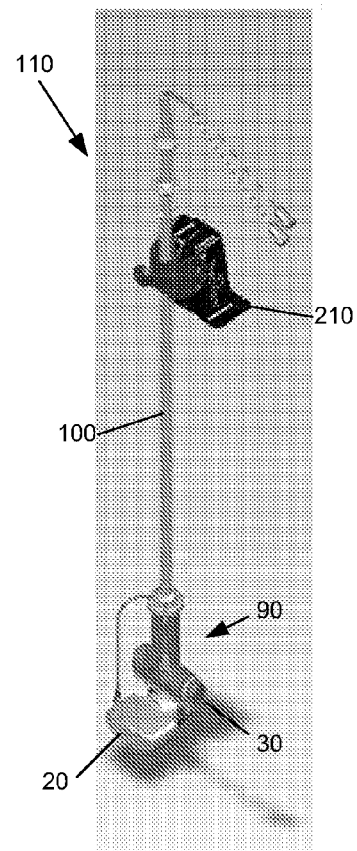
FIG. 3D illustrates a perspective view of the mountable pan and tilt sonar module shown in FIG. 2.

As shown in FIG. 2, the sonar data acquisition device 20 is removably connected to the positioning device 30 by way of a clamping mechanism or the like to form a pan and tilt sonar module 90. In one embodiment, the sonar data acquisition system 20 is removably connected to the positioning device 30 by way of a plurality of brackets 80 and 120. Bracket 120 secures and fastens sonar data acquisition device 20 to bracket 80 by way of screws 130, although other types of fasteners may be employed. Collectively, bracket 120, sonar data acquisition device 20, and bracket 80 are secured and fastened to positioning device 30 by way of screws 140 and rotator arm 150. Rotator arm 150 is rotatably connected to bracket 80 and positioning device 30 by way of screws 160, allowing positioning device 30 to freely rotate. A pan and tilt mount 170 is also connected to positioning device 30, allowing the positioning device 30 to freely pan and tilt.

FIG. 2 shows the pan and tilt sonar module 90 being removably connected to a pole 100 by way of a plate mount 180, and screws 190 and 200, forming a mountable pan and tilt sonar module 110, although a rod, a shaft, a post, or the like maybe employed. In one embodiment, the mountable pan and tilt sonar module 110 is removably installed to a vessel via a quick release mounting mechanism 210 located in proximity to a distal end of pole 100. The mountable pan and tilt sonar module 110 may be permanently bolted, for example, to the swim step on the aft section of a vessel. The clamping mechanism 210 holds the pole 100 firmly under the water when fully deployed. In one retracted position, the mountable pan and tilt sonar module 110 can also be loosened to allow pole 100 to be raised out of the water. In another retracting position, the clamping mechanism 210 can also be rotated over the top of the mountable pan and tilt sonar module 110 to lay the raised pole 100 across the swim steps of the vessel. These two retracted positions allow the vessel to travel quickly without the need to completely remove and stow the mountable pan and tilt sonar module 110. When needed, pole 100 can be completely removed from the pan and tilt sonar module 90 and be stowed in a safe location. In one embodiment, mountable pan and tilt sonar module 110 is installed to the inside wall of the vessel's cuddy cabin by way of at least one mounting bracket. In another embodiment, mountable pan and tilt sonar module 110 is fixed mounted on the hull or the transom of the vessel.

The mountable pan and tilt sonar module 110, comprising the sonar data acquisition device 20 and the positioning device 30, is electronically and removably connected to the computer system 40. In one embodiment, the sonar data acquisition device 20 of the mountable pan and tilt sonar module 110 comprises at least one port from which the mountable pan and tilt sonar module 110 is connected to the computer system via, for example, an Ethernet connection. In another embodiment, the positioning device 30 is electronically and wirelessly connected to the computer system 40. Any radio frequency protocol or standard wireless internet protocol known in the art may be employed. The computer system 40 is also electronically connected to a navigation system 70. Target angle feedback is provided from internal position sensors positioned in the positioning device 30 and feedback is digitally sent to the computer system 40.

The sonar data acquisition device 20 preferably utilizes multiple beams to provide acoustic data to the computer system 40, which produces high definition two dimensional (2D) or three-dimensional (3D) sonar imagery utilizing the acoustic data. The sonar imagery may be produced, for example, by multi-beam 2D imaging, multi-beam 3D imaging, mechanical scanning 2D imaging sonar systems, 2D bathymetry, and the like. The sonar data acquisition device 20 preferably comprises at least one tilt and roll sensor (not shown in the figures), which is capable of providing tilt feedback to the computer system 40. In one embodiment, the sonar data acquisition device 20 may be any of the frequency-steered acoustic array systems as disclosed in U.S. Patent Publication No. 2005/0007882 A1, which is incorporated herein by reference in its entirety. In one example, the sonar data acquisition device 20 comprises an acoustic array incorporating a plurality of acoustic transducer elements having aperiodic spacing and/or phasing, and the sonar data acquisition device is capable of transmitting and/or receiving frequency-steered acoustic beams having a field of view adjustable by means of frequency band selection. In another example, the sonar data acquisition device 20 comprises an acoustic array capable of transmitting and/or receiving frequency-steered acoustic beams in at least two fields of view oriented in different directions, the array comprising a plurality of acoustic transducer elements, each of the elements being phase shifted with respect to neighboring elements, and each of the elements being in electrical communication with a controller capable of switching the polarity, the phase shifts, or interconnections of at least a portion of the elements to select an active frequency-steered field of view.

In yet another example, the sonar data acquisition device 20 comprises an acoustic array combination having a plurality of spaced acoustic transducer elements capable of transmitting and/or receiving frequency-steered acoustic beams having a field of view adjustable by means of frequency band selection arranged at an angle to and in substantially the same plane with at least one additional acoustic array, whereby the array combination is capable of transmitting and/or receiving acoustic pulses in different fields of view in a single plane. In still another example, the sonar data acquisition device 20 comprises an acoustic array combination having a plurality of spaced acoustic transducer elements capable of transmitting and/or receiving frequency-steered acoustic beams having a field of view adjustable by means of frequency band selection arranged at an angle to and in substantially the same plane with at least one additional acoustic array, arranged at an angle to and in a generally orthogonal plane to the plane of at least one additional acoustic array, whereby the array combination is capable of transmitting and/or receiving acoustic pulses in different fields of view in two planes that are generally orthogonal to one another.

The positioning device 30 is capable of positioning and orienting the sonar data acquisition device 20, and is capable of aiming the sonar data acquisition device 20 towards a direction of interest, while being able to provide positioning and orientation feedback to the computer system 40. The positioning device 30 may be a pan & tilt device, pan only device, tilt only device, multi-axis positioning device, tilt with vessel orientation for pan, or the like. In one embodiment, the disclosed vessel-mountable sonar system 10 can utilize a tilt-only implementation to carry out panning function by changing the heading of the vessel. Alternatively, the disclosed system 10 can also use a fixed mount imaging sonar data acquisition device 20 with no pan and tilt as long as the vertical field of view is adequate to ensonify the bottom or water column in a wide variety of depth environments.

The computer system 40 comprises at least one processing unit which controls the mountable pan and tilt sonar module 110, and computer system 40 also collects, stores, computes, processes, and provides sonar data and signals, sonar imagery, and navigational data and processes. The computer system 40 interfaces with at least one data storage system 50 and/or at least one image display 60. The computer system 40 preferably provides a user interface, such as a keyboard, an interactive image display device 60 such as a touchscreen, or another user interface. An operator is preferably able to control the direction of the sonar by operating the positioning device 30 from the interface; select imaging modes and sonar images from the image display device 60 from the interface; select targets and using the interface, and otherwise operate the sonar system 10 to locate, identify, display, inspect and track sonar targets. In one embodiment, a joystick controller is provided as an interface, wherein the joystick controller is able to control both the sonar data acquisition device 20 and the positioning device 30.

The computer system 40 may be integrated with the mountable pan and tilt sonar module 110, but is preferably a separate unit that communicates with the sonar data acquisition device 20 and the positioning device 30. Communication between the computer system 40, the positioning device 30 and/or the sonar data acquisition device 20 is preferably two-way communication, so that an operator may input instructions through the user interface of the computer that controls the positioning device 30 and the data collected by the sonar data acquisition device 20. The computer system 40 comprises or is interfaceable with at least one image display device 60 and a plurality of control inputs. The image display device 60 presents the imagery to the operator, and in one embodiment, the image display device 60 has input capabilities and may comprise a touch screen having input capabilities. In another embodiment, the image display device 60 may comprise a sunlight readable screen. The image display device 60 may be installed on the vessel's ceiling, console, walls, or on another part of the vessel, and it may be a heads-up image display device system that displays data and/or images on an accessory screen or device. In another embodiment, the image display device 60, or an accessory image display device 60 may comprise a portable display which can be worn on or held by the operator. In yet another embodiment, the image display device 60 is installed within another larger image display device system.

The data storage system 50 connects to or forms a part of the computer system 40 to save the collected acoustic data, sonar imagery, target data and imagery, sonar device orientation data, and navigational data, for example. This data may also be electronically transmitted, and optionally wirelessly transmitted to a remote location for display, processing, or longer term or additional storage by way of any wired or wireless transmission systems and protocols that are known in the art.

The processing or computer system 40 of the disclosed invention preferably comprises or interfaces with one or more navigational tools, such as a compass and/or a global positioning device (GPS) forming part of a vessel navigational system 70. Any compasses and global positioning devices known in the art may be incorporated in navigational system 70 and interfaced with the processing or computer system 40 of the disclosed invention using hard-wired and/or wireless protocols. The navigational system 70 may also incorporate navigational data such as three dimensional charts including detailed latitude, longitude, depth, and navigational hazard and aid information, weather information, and the like, or such information may be separately incorporated in or interfaced with the processing or computer system 40 forming a part of the sonar system of the disclosed invention. The navigational system 70 or components preferably provides spatial coordinates relating to the position of the vessel and, interfaced with the sonar and processing systems, may also provide spatial coordinates for various sonar targets. When interfaced with navigational data, the navigational system 70 may also provide spatial coordinates relating to the position of various navigational obstacles, aids, and the like.

An operator may use the computer system 40 and data storage system 50 to store raw or processed data, such as acoustic sonar data, positioning device data, navigational data, or the like, for later retrieval and review, or various programmed storage protocols may be provided and selectable by an operator. For example, navigational data can be collected and combined with the sonar data acquisition device 20 positioning information provided by the pan and tilt sonar module 90 to unambiguously map spatial locations (i.e. pixels) shown on a sonar image to a specific geo-referenced position, which is critical for accurately measuring distances and creating geo-referenced mosaics and overlays of the collected data.

In operation, an operator preferably controls the mountable pan and tilt sonar module 110 from a user interface provided as part of the computer system 40 and/or displayed on the image display device 60. The operator may thus "point" the sonar data acquisition device 20 to various underwater areas or target(s) as desired. Alternatively, various automated inspection or surveillance routines may be selectable by the operator and, when selected, perform a predetermined or selectable sonar inspection routine covering predetermined underwater areas with relation to the vessel. Real-time data relating to the orientation of the positioning device 30 and the sonar module orientation is preferably communicated to the computer system 40 and displayable to the user on the image display device 60. For example, relative pitch and yaw information for what the sonar data acquisition device 20 and the positioning device 30 is known and may be displayed. Additionally, because the sonar data acquisition module 90 is fixed with respect to the vessel and the orientation of the module 90 is known, the pitch and yaw orientation of the vessel may be calculated and displayed to the operator.

In preferred embodiments, in which the sonar data acquisition device 20 and/or the positioning device 30 incorporates one or more tilt and roll sensor(s), and the absolute position is referenced and interfaced with the sonar system 10, the target(s) shown on the image display device 60 may have a true latitude and longitude associated with them. Targets may thus be accurately geo-referenced using the sonar system 10 of the disclosed invention and, once a target is selected for tracking, the computer system 40 may automatically maintain the pan and tilt sonar module 90 aimed and pointed at the target independent of the vessel's position and orientation. Even if the target moves out of range, the pan and tilt sonar module 90 can be aimed and pointed at the target to indicate to an operator where he needs to maneuver the vessel to locate the target, and desired headings to the target may be provided and displayed to the operator. Once a target is identified on the image display device 60 and/or selected by an operator, and its position geo-referenced, the system may also maintain the selected target in the sonar system field of view and in the image display device 60 to the user, and provide automated tracking of the selected target by automatically positioning the sonar data acquisition device 20 in an appropriate orientation to maintain the selected target in an appropriate field of view. In this fashion, the sonar system of the disclosed invention may provide continuous target maintenance and tracking.

Furthermore, an operator can detect a target in situ and mark the target on the sonar image display device 60. Since a target of interest and the vessel are geo-referenced via the disclosed vessel-mountable system 10 in a, for example, local self-consistent coordinate system, the sonar data acquisition device 20 can be constantly pointed to and aimed at the target and some indication by way of, for example, screen icon(s), of the expected screen location of the last known position of the target can be displayed. Thus, the disclosed system 10 has the advantage of constant monitoring of and rapid reacquisition of a target of interest even if the operator loses contact with the target due to operator attention lapses, targets moving out of the sonar system's range or field of view, or occlusion of the target by acoustic obstacles, such as prop wash.

The absolute position and angle data of the sonar acquisition device may also be utilized to overlay on a chart and provide a large area mosaic displayable on the image display device 60, providing target geo-referencing information such as target latitude, longitude, and depth information. The sonar data acquired from the disclosed system, over multiple pings, can be laid down on the chart as described above as a larger area mosaic image, with geo-referenced and accurate spatial positioning and special dimensions. Each mosaic image may be assigned a unique identifier and the operator may have the ability to selectively turn "on and off" an individual mosaic image, or select from among multiple mosaic images. Larger mosaic images may be compiled and created at the option of the operator and by manipulation of multiple mosaic images.

Steering of the vessel underway can be utilized to home in on targets of interests. In this mode of operation, the operator can adjust the sonar module orientation to rapidly approach a target of interest. Since the imagery is within sight of the vessel's operator, he can use the imagery of a target to adjust the vessel's heading until the vessel is directed towards the target. As the vessel moves closer to the target of interest, the pan and tilt sonar module 90 can easily be re-positioned and adjusted (e.g. reduce max range settings) to maintain a desired display imagery. Homing in on a selected target visualized using the sonar system may also be accomplished in an automated fashion when the vessel's navigational and/or steering systems are interfaced with the system.

Figure 4A:
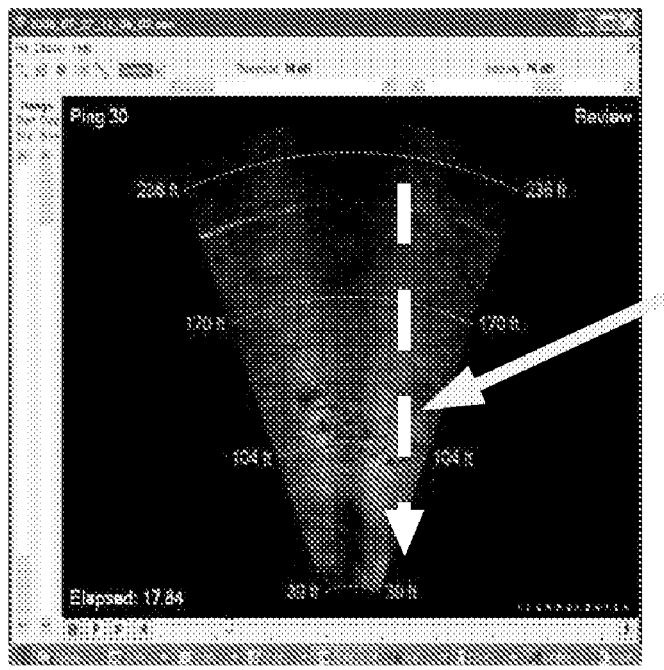
FIG. 4A illustrates a relationship between a sonar image orientation and the sonar device and positioning module in an intuitive target display provided on an image display device.
Figure 4A:
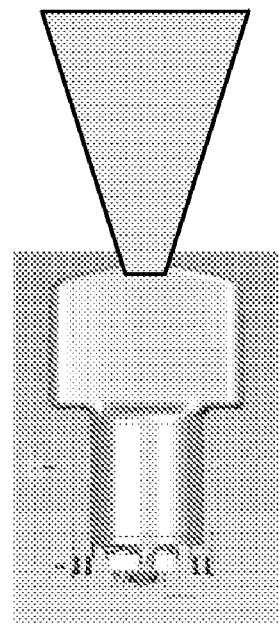
Figure 4B:
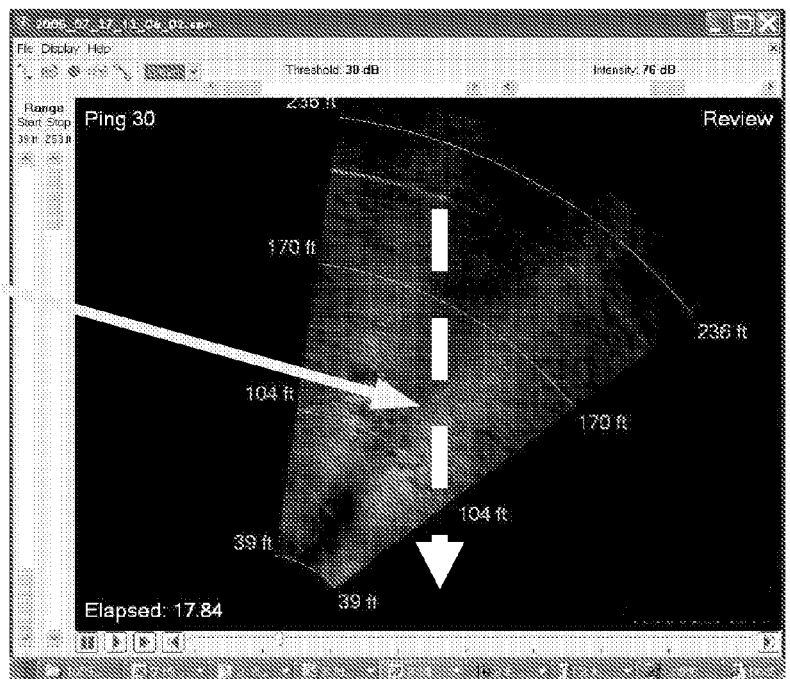
FIG. 4B illustrates another relationship between a sonar image orientation and the sonar device and positioning module in another intuitive target display provided on an image display device.
Figure 4B:
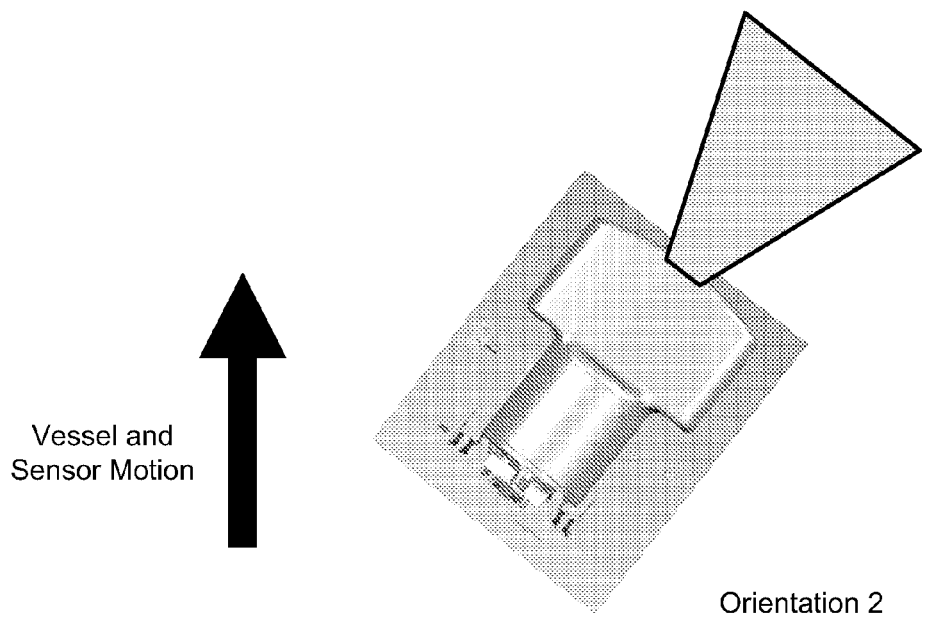

In one preferred embodiment, the sonar imagery on the image display device 60 is preferably oriented to match the rotational angle of the sonar data acquisition device 20 and the pan and tilt sonar module 90, as shown in FIGS. 4A and 4B. When the pan and tilt sonar module 90 is pointed in the orientation shown in FIG. 4A, or directly "at" the target, for example, the sonar image provided on the display 60 has the same orientation with respect to the target and the target(s) flows from top to bottom on the image display device 60. When the pan and tilt sonar module 90 is rotated so that it points at an angle with respect to or to the side of the vessel's center line 250, as shown in the orientation of FIG. 4B, the sonar image is also rotated on the image display device 60—at the same angle with respect to the centerline 250 of the vessel. This feature allows the viewer to view the target(s) as it's oriented with respect to the viewer's and vessel's orientation and provides an intuitive display feature, dramatically improving the operator's ability to understand and dynamically react to the image display device 60 information, and consequently allowing ease in navigating the vessel based on the imagery.

The disclosed sonar system 10 can also be used to avoid navigational hazards. In one embodiment, for example, the sonar system may be programmed to provide an indication, such as trigger an alarm, when a target having a particular size or shape or another property is determined to be within range of the system, or within a particular distance from the system and the vessel. This alerts an operator to inspect the sonar image, and the operator may investigate the target to identify its position, character, and the like.

In another embodiment, the sonar system is interfaced with navigational systems such as (digital) charts that locate and identify navigational hazards and may optionally also be interfaced with an automated vessel steering system. In one embodiment, for example, the position of navigational hazard(s) indicated on a chart or another navigational aid are geo-referenced and input to the computer system controlling the sonar data acquisition device and image display device. As the vessel and sonar acquisition systems near an identified and geo-referenced navigational hazard, the system may provide a notification, such as trigger an alarm, to indicate that the navigational hazard is within range of the sonar system and the vessel. Various alarm ranges may be programmed or programmable in the computer system. In an integrated system, the vessel's steering system may be interfaced with the sonar system and may steer the vessel away from identified navigational hazards or may maintain a predetermined or programmed or programmable distance between the vessel and the identified navigational hazards once they're within range of the sonar data acquisition device. The sonar system may similarly be programmed to provide automated identification and alarm The sonar acquisition device may be provided in a generally forward-looking and/or downward-looking orientation. If there are limitations to adjusting the orientation of the sonar acquisition device using a pan and tilt or similar mechanism, the field of view of the pan and tilt sonar module 90 may be rotated, as required, to provide the desired field of view. The sonar acquisition device may be positioned in a generally downward looking position, for example, and rotated by 90 degrees around the center axis of the sonar system's housing to re-orient the sonar data acquisition device in a forward-looking orientation. This may be achieved by loosening bracket 120 that holds the sonar data acquisition device 20 to the positioning device 30 and physically rotating the sonar data acquisition device 20 by 90 degrees.

In addition, during operation, the sonar data acquisition system 20 may act as a directional indicator via rotated imagery on the imagery display 60 (FIGS. 4A and 4B), wherein the sonar data acquisition device 20 is always pointed and aimed towards the closest point of approach to an identified or selected target displayed on the sonar image. In one embodiment, when the latitude and longitude data of an identified target of interest is known and the vessel is approaching the target of interest, the pan and tilt sonar module 90 is automatically oriented to point and aim towards the target to provide steerage guidance for the vessel operator to steer the vessel toward the target, while minimizing the operator's maneuvering task. In one embodiment, the disclosed vessel-mountable sonar system may incorporate a notification or alarm feature, that is activated when the target is close to the position of the vessel or if the vessel begins to veer off the course towards the target. In another embodiment, multiple waypoints can be utilized to fully investigate an entire area of interest.

As mentioned above, navigational and real-time location data may be input into or interfaced with the computer system 40, providing sonar images that are mapped to a geo-referenced position. The geo-referenced position and navigational data can be utilized to allow the user to point and click on a target of interested and acquire the actual position and/or depth of the target. Alternatively, a target of interest can be chosen on the sonar imagery and the navigation system 70 aims and locks into the target, allowing the vessel to be steered towards the target. The navigation system 70 may also track a moving target automatically by way of the geo-referenced position and navigational data.

In another embodiment, the navigational data, object geo-referencing routine data, and the position of a moving target such as a diver, is integrated in the computer system and may be displayed on the image display device 60. Using automated tracking routines, the computer system 40 can automatically track the moving target and acquire continuous position and vector data of the target. For example, in one embodiment, the operator can touch soft-keys on the image display device 60 to operate the positioning device 30. This allows the operator to manually aim the sonar data acquisition device 20 at targets of interest. In this embodiment, the vessel can be in a stationary position and nearby underwater activities can still be monitored by the disclosed system 10. For example, the vessel can be tied to a dock and the pan and tilt sonar module 90 can be oriented toward a target on interest for a dive operation. The divers can then enter the water and the operator can watch the divers approach the target(s) while re-positioning the pan and tilt sonar module 90 to provide the best imagery or coverage or track target(s) outside of the field of view. The operator can also sweep the pan and tilt sonar module 90 back and forth between multiple scenes within the system's imaging range. Further, the operator can direct the diver via acoustic communications or other techniques while monitoring the diver's progress toward the a target by way of the disclosed vessel-mountable system 10.

It will be understood that the foregoing descriptions of various embodiments of methods and systems of the disclosed invention are merely illustrative of the invention and its varied embodiments. Modifications to various aspects of the methods and systems of the disclosed invention will be apparent to those skilled in the art and are intended to fall within the scope and purview of this disclosure and the following claims.

We claim:

1. A vessel-mountable sonar system, comprising:
   (a) at least one imaging sonar data acquisition device; and
   (b) at least one processing system electronically and removably connected to the at least one imaging sonar data acquisition device and interfacing with a display for displaying sonar imagery;
   wherein the sonar data acquisition device provides acoustic data and orientation and/or positioning feedback based on the position of the sonar acquisition device to the processing system and the processing system displays sonar images at an angle with respect to the vessel centerline that corresponds to the angular orientation of the sonar acquisition device with respect to the vessel centerline.

2. The system of claim 1, additionally comprising at least one positioning device having at least one internal position sensor, wherein the sonar data acquisition device is removably connected to the positioning device, and wherein tilt and azimuth direction feedback is acquired by the internal position sensor and communicated to the processing system.

3. The system of claim 2, wherein the sonar data acquisition device and the positioning device are removably installed on a vessel via a mechanical mounting mechanism.

4. The system of claim 1, wherein the at least one processing system interfaces with a data storage system.

5. The system of claim 1, additionally comprising at least one navigational system, wherein the navigational system is electronically connected to the processing system, wherein the processing system interfaces with and acquires input from the navigational system.

6. The system of claim 2, wherein the at least one internal position sensor is a tilt and roll sensor.

7. The system of claim 1, wherein the sonar data acquisition device is a multi-beam 2D or multi-beam 3D imaging device.

8. The system of claim 1, wherein the sonar system is a 2D forward-looking sonar system.

9. The system of claim 1, wherein the sonar system is a 3D forward-looking sonar system.

10. The system of claim 1, wherein the sonar system is a 2D bathymetry sonar system.

11. The system of claim 1, wherein the processing system stores location coordinates for vessel and target locations.

12. The system of claim 11, wherein the processing system interfaces with at least one navigational tool and selected target location(s) are geo-referenced using location coordinates for target locations and are identified and displayed by the sonar system.

13. The system of claim 11, wherein spatial locations of selected target location(s) are mapped to geo-referenced position(s) on the display.

14. The system of claim 11, wherein the sonar system provides automated tracking of selected geo-referenced target location(s) independent of vessel alignment and position.

15. The system according of claim 11, wherein the sonar data acquisition device is programmed to aim toward the closest point of approach to a selected target displayed on the sonar image.

16. The system of claim 1, wherein the data acquisition device is a frequency-steered acoustic array system.

17. The system of claim 1, wherein the processing system additionally incorporates automated inspection routines that are selectable by a user to perform a predetermined sonar inspection routine covering predetermined underwater areas with relating to the vessel.

18. The system of claim 1, wherein the sonar system is additionally interfaced with an automated vessel steering system that steers the vessel away from a selected target that is within range of the sonar system.

19. The system of claim 1, wherein the sonar system is additionally interfaced with an automated vessel steering system that maintains a predetermined or programmed distance between the vessel and the identified navigational hazards that are within range of the sonar system.

* * * * *